June 30, 1959   E. M. KEEN ET AL   2,892,604
SUPPORTING STAND FOR FEEDER TROUGHS AND THE LIKE
Filed July 15, 1954   2 Sheets-Sheet 1
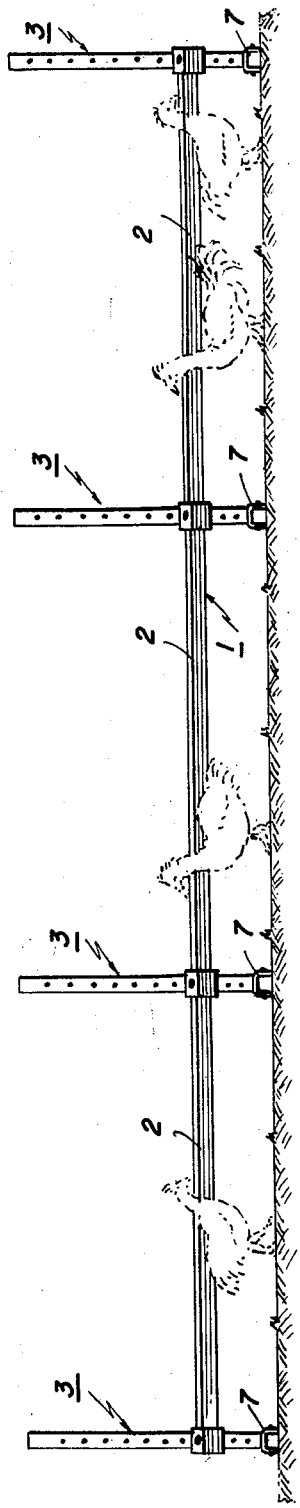
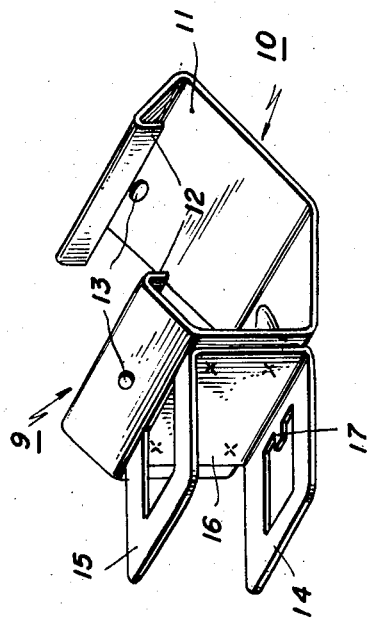
INVENTOR
**EVERETT M. KEEN &
ANTHONY J. SICILIANO**
BY
ATTORNEY

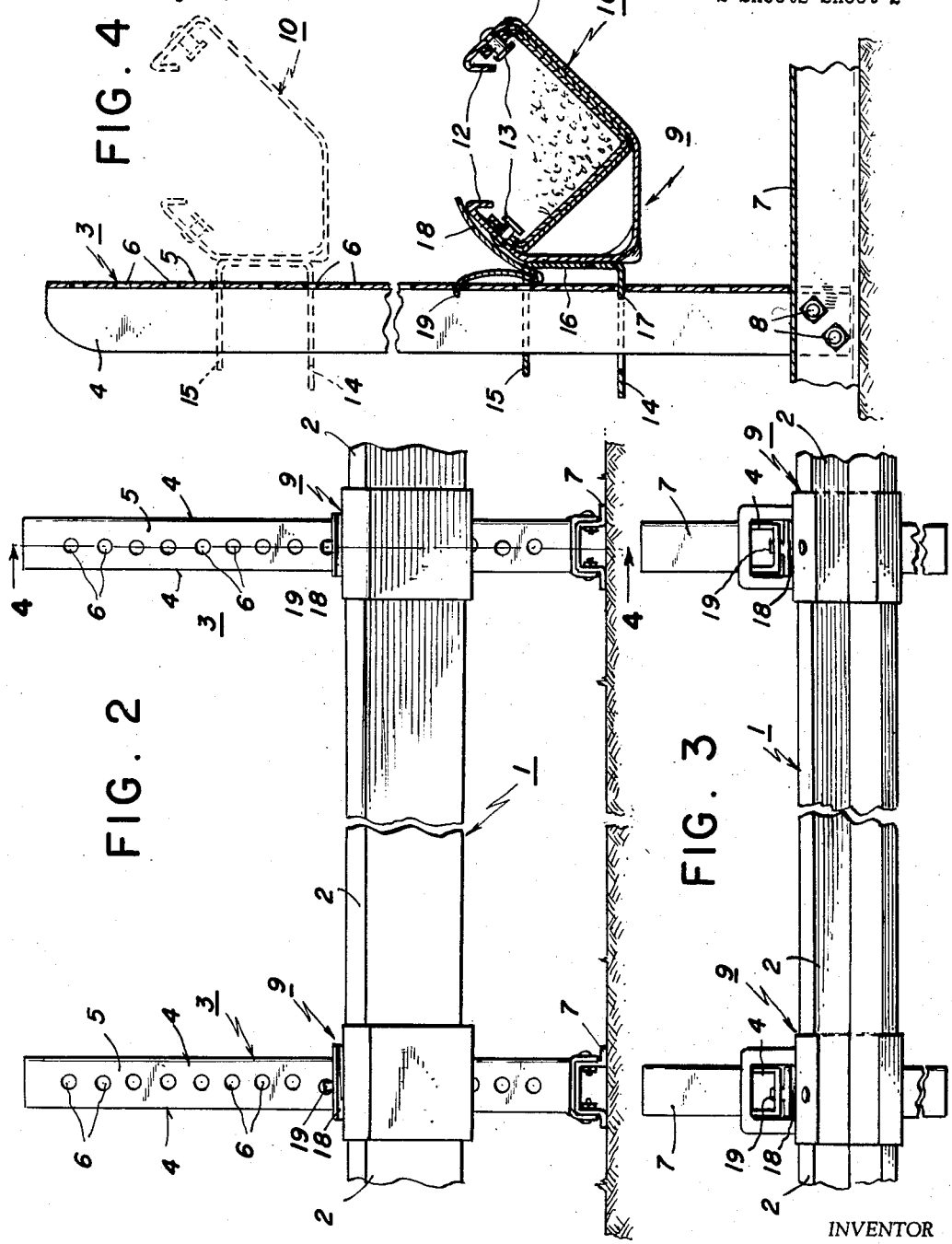

United States Patent Office 2,892,604
Patented June 30, 1959

2,892,604

SUPPORTING STAND FOR FEEDER TROUGHS AND THE LIKE

Everett M. Keen and Anthony J. Siciliano, Vineland, N.J., assignors to Keen Manufacturing Corporation, Vineland, N.J., a corporation of New Jersey Application July 15, 1954, Serial No. 443,506

4 Claims. (Cl. 248—125)

The present invention relates to supporting stands for feeder troughs and the like, and its primary object is to provide a versatile and highly adaptable leg for supporting at adjustable heights above the ground or floor an elongated element such as the trough of an automatic or other type of feeding device for poultry.

In the larger and more efficient poultry-raising operations it is common to feed the birds from an elongated trough to which feed is supplied by a hopper and along which it is moved by conveyor means such as an endless chain. An example of such type of feeding apparatus is shown in our copending application Serial No. 267,756, filed January 23, 1952, now Patent No. 2,699,250, January 11, 1955. The trough is disposed horizontally on the floor of the chicken house or on the ground and the birds gather along the sides of the trough and take the feed from it.

The troughs of some automatic feeders are endless, being arranged in a closed circuit with the supply hopper for return thereto of uneaten feed, and others are provided in the form of a straight single length of trough, with supply and discharge hoppers at opposite ends and with the endless conveyor return run on the under side of the trough. In all cases, however, the trough is apt to be long for simultaneously feeding a large number of birds, and this generally involves making the trough of a plurality of lengthwise aligned sections joined at their abutting ends and supported in some manner on the floor or ground.

It is desirable that the trough be supported at an elevation above the floor or ground which is rather carefully selected with relation to the height or size of the birds that are to be fed. A trough arranged at a height suitable for convenient access by large birds standing on the floor or ground that supports the trough will be out of reach by birds of much smaller size, so that such birds will find it necessary to perch on the edges of the trough to reach the feed. This is objectionable, but the best prior art solutions of the problem, so far as we are aware, involved using stands or legs of different fixed heights for birds of different size, or using a single compromise height which would of course be too high for small birds and too low for large birds, or providing for adjustment by nut and bolt or analogous fastenings which are time-consuming to adjust, or employing some insecure and impractically unstable type of connection which would at times slip or move with resulting frightening of the birds.

The present invention provides a single type of leg or stand element wihch can be placed at spaced intervals along a feed trough and can be instantaneously adjusted to fix the trough securely at any one of a wide range of heights, so that the same feeding equipment can be quickly changed to suit it for use by flocks of birds of any size.

Objects of the invention are to provide a device of the character indicated which will be simple to adjust, economical for the manufacturer to make, for dealers to stock and for poultrymen to buy, and which will support the trough at any point in its range of heights with as much security and stability as is attained by any of the fixed legs of the prior art.

Another object of a preferred embodiment of the invention is to provide a leg or support which can be applied to the meeting ends of aligned trough sections and which will couple the sections together as well as hold them at proper selected elevation.

Other objects and advantages will be apparent to those skilled in the art from the following description of the preferred embodiment shown in the accompanying drawings in which Figure 1 is a side elevational view of a length of feeding trough supported by a plurality of legs made and assembled in accordance with the present invention;

Fig. 2 is a relatively enlarged detail side elevational view showing two of the new legs in operative position;

Fig. 3 is a top plan view of the structure shown in Fig. 2;

Figure 4 is a vertical sectional view taken on the line 4—4 of Fig. 2 showing the trough-engaging bracket in two of its adjusted positions; and Fig. 5 is a perspective view of the trough-engaging bracket.

Broadly speaking, the invention comprises cradling the trough in brackets disposed at spaced intervals along the trough and mounting the brackets at adjustable elevations on uprights or standards by means of a secure but instantly separable connection between each bracket and its standard.

In the illustrated embodiment of the invention depicted by the drawings, the numeral 1 designates generally a trough which may be of the type shown in our aforementioned Patent No. 2,699,250, being assembled from a plurality of endwise aligned sections 2, each formed from sheet metal of suitable gauge and shaped into the cross section best shown in Fig. 4. Such a trough is of general V-shape in cross section, having a pair of side walls intersecting at their bottom and having preferably a pair of convergingly directed short or narrow lips at the top of the trough which desirably stiffen the metal.

Of course troughs of other cross sectional shape can be use, but the V-shape is preferred for use with conveyor members of the type disclosed and claimed in our copending application.

The trough sections are provided in any convenient lengths, say 8, 10 or 12 feet. They are connected at their ends, as has been stated, to form a single trough of desired length, which may be arranged in a closed circuit including a feed supply hopper. In some instances it will be preferred to arrange the trough sections in a single-length form, with a feed hopper at one end and a receiving or discharge hopper at the other end, connected by an endless or any other type of conveyor means positioned in the trough.

However, the foregoing details of trough structure and conveyor means form no part of the present invention. On the contrary, the present invention is concerned with vertically adjustably mounting the trough and incidentally connecting its sections, from which it will be evident that the invention is applicable to troughs which are not provided with feed or discharge hoppers and which may not contain conveyor mechanism. Such troughs can be supplied manually with feed, but they require support at proper elevations above the floor or ground to accommodate poultry of different size, as has been explained.

The support provided by the present invention comprises a series of identical uprights or standards 3. Each of these members is best made of a short length of sheet metal or other channel stock having a pair of side flanges 4, 4 connected by a flat web 5 provided with a series of aligned perforations 6. Each upright is securely mounted on a cross foot 7, conveniently made of flanged channel stock of sufficient length to provide good stable support for the standard. The standard may be affixed to its foot by removing enough of the standard web at its lower end portion to provide a pocket defined by the projecting side flanges of the standard and passing a pair of bolts 8 through these projecting flange ends and the engaging sides of the foot 7, as shown in Fig. 4.

Each of the standards is provided with a bracket 9 of special shape, as best shown in Fig. 5. This bracket is conveniently made of stiff sheet metal and comprises two principal parts. A cradle portion 10 includes preferably a plate area 11 adapted to engage the outer surface of one of the walls of the trough sections, and this plate area continues integrally through a series of bends, as shown in Figs. 4 and 5, to enclose the entire cross section of the trough section, terminating in top flanges or lips 12 which are downturned to fit over the upper edges of the trough walls.

The arrangement is such that when a pair of trough sections are slipped endwise into the cradle portion they will be securely held in end-abutted relation, or even in slightly overlapped end relation, against movement up or down, as will be understood.

To fix the projection of the trough section ends into the cradle, a pair of stops or abutments in the form of buttons 13 may be mounted in the upper zone of the cradle portion. These buttons constitute stops against which the ends of the trough sections may be pushed.

Projecting to the rear from the cradle portion of each bracket are a pair of vertically spaced plates, each provided with a large central opening, completely surrounded by the material of its plate, or at least closed at its rear by the plate structure. The opening in the lower plate 14 is vertically aligned with the opening in the upper plate 15 and is slightly larger or is rearwardly offset, as shown in Fig. 4. The two plates are conveniently formed as projections from a connecting plate 16 which is welded or otherwise permanently secured to the back of the cradle portion 10 of the bracket. A short lug 17 extends rearwardly from the front side of the lower plate opening and projects a short distance towards the center of the opening.

The opening in the upper plate 15 is large enough to admit the upright or standard 3, with a reasonable amount of clearance or play; the lug 17 is sized appropriately for fitting any of the perforations 6; and the size of the opening in the lower plate 14 and the extent of the projection of the lug 17 into that opening are so related to the cross sectional size of the upright 3 that the lower plate opening will pass the upright in sliding engagement with the lug clearing the perforations 6.

It will be evident from the foregoing specifications of sizes and proportions that the bracket may be seated on the upright by passing the openings in the plates 14 and 15 down around the upright, with the bracket cocked or canted sufficiently to keep the lug from entering any of the perforations and that in this relationship of the parts the bracket may be slid up or down the standard from end to end thereof. It will also be evident that the bracket may be fixed at any one of a large number of elevations on the upright by simply allowing the lug 17 to enter a selected one of the perforations 6. The lug will be held seated in the selected perforation by the weight of its cradle portion, which tends to rock the bracket in a clockwise direction as viewed in Fig. 4. In this position the lug 17 is seated in a perforation 6 and the material of the plate 15 which closes its opening at the back is held against the free edges of the flanges of the standard.

It will be evident also that when the ends of two trough sections are seated in the cradle portion 10 of the bracket, in the manner hereinabove explained, the bracket can be fixed at any adjusted elevation on the standard to hold the trough sections at any selected height. When this adjustment is made with all the brackets supporting the complete trough, the trough as a whole is mounted accurately horizontally at the selected height, as will be understood.

If desired or thought necessary, in order to prevent accidental rocking of the bracket and its supporting trough in a counterclockwise direction as viewed in Fig. 4, which might unseat the lug 17 from its perforation 6, a clip 18 may be applied in more or less wedging relation between the bracket and standard as shown in Fig. 4.

This clip comprises a generally V-shaped short length of slightly resilient sheet metal having a short lug 19 projecting from its upper rear edge. With the bracket assembled on the standard, this clip may be wedged in place by inserting the lug 19 through a perforation 6, with the vertex of the clip entering the front portion of the opening in the upper plate 15 and with the front leaf of the clip bearing down on the rear wall of the cradle portion 10 of the bracket. Such insertion of the clip very securely holds the bracket in place and prevents its becoming dislodged by any accidental blow, as by the hand of an attendant or otherwise.

Broadly considered, and within the scope of the broader of the appended claims, the invention does not require the clip 18. Many poultrymen find that the weight of the trough, particularly when the trough includes a conveying chain or the like, is sufficient to hold the brackets securely seated at the selected elevations, and they have no difficulty with upsetting or loosening by action of the birds.

It is believed that the details of the preferred form of construction of the invention, as well as its principal advantages, will be evident to those skilled in the art from the foregoing description and explanation. It is to be understood that the invention is capable of being embodied in other and further modified forms, all within the scope and purview of the appended claims. For example, in the illustrated embodiment the uprights or standards 3 are of channel shape and are provided with round openings 6 in their webs for reception of the lugs 17. However, it is deemed to be obvious that within the spirit of the invention, as defined by the broader of the claims, the uprights could be shaped otherwise than in channel form and the perforations could be different from the round holes which we prefer and could be located differently, e.g., the perforations could be edge notches, indentations or projections in the web or flange of a channel, in the flange of an angle iron or in the edge of a flat bar. All such are intended to be included within the comprehension of the recitation of perforated standards as used in the broader of the claims.

We claim:

1. A supporting stand for a sectional feeder trough comprising a standard provided with a vertical series of perforations, a trough-engaging bracket having a trough-supporting cradle portion and a vertically spaced pair of sheet metal flanges extending unilaterally therefrom with vertically aligned apertures in the flanges penetrated by and substantially completely enclosing the standard, a lug projecting from the lower flange into the aperture thereof and received in a selected perforation of the standard for positioning the bracket at an adjusted elevation on the standard, and abutment means formed on the bracket and projecting into the cradle portion thereof for engaging and positioning the meeting ends of a pair of aligned feed trough sections supported by the bracket.

2. The combination claimed in claim 1, in which the cradle portion of the bracket is generally channel-shaped and the abutment means comprises a pair of buttons mounted in spaced relation on opposed walls of the channel-shaped bracket.

3. In a stand for supporting a feed trough of the type in which a plurality of trough sections are secured in end to end alignment in a support, the combination with said support of a bracket having a cradle portion of substantially channel shape for receiving and supporting the sections in end to end alignment and having an abutment formed on the cradle portion and projecting substantially normally into said cradle portion intermediate the opposite end edges thereof so as to provide a pair of surfaces each facing one of said opposite end edges to act as stops for engaging and positioning the end edges of a pair of aligned sections of the trough inserted from said opposite end edges of the cradle portion.

4. The combination claimed in claim 3 including a pair of abutments each formed on an opposite side wall of the channel shaped cradle portion of the bracket.

References Cited in the file of this patent

UNITED STATES PATENTS

| | | |
|---|---|---|
| 426,446 | Hawkins | Apr. 29, 1890 |
| 485,008 | House | Oct. 25, 1892 |
| 542,860 | Noxon | July 16, 1895 |
| 1,020,951 | Patchin | Mar. 19, 1912 |
| 1,206,203 | Brockway | Nov. 28, 1916 |
| 1,384,250 | Froom | July 12, 1921 |
| 1,488,300 | Thompson | Mar. 25, 1924 |
| 1,614,550 | Hass | Jan. 18, 1927 |
| 2,486,077 | Taylor | Oct. 25, 1949 |
| 2,615,666 | Jones | Oct. 28, 1952 |
| 2,626,724 | Smallegan | Jan. 27, 1953 |
| 2,675,132 | Susil | Apr. 13, 1954 |

FOREIGN PATENTS

| | | |
|---|---|---|
| 586,346 | Great Britain | Mar. 14, 1947 |